Sept. 1, 1959 J. H. VAN OSCH 2,901,939
APPARATUS FOR SYNCHRONIZING SOUND WITH MOTION PICTURES
Filed Dec. 9, 1954 4 Sheets-Sheet 1
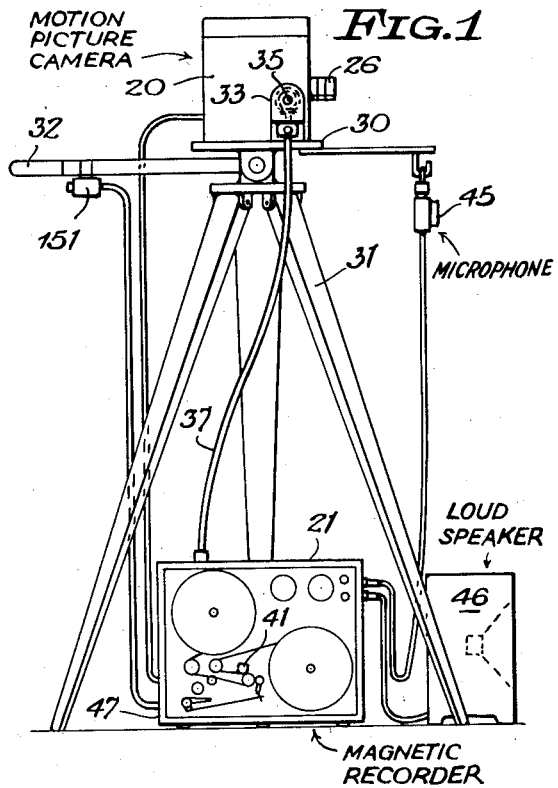
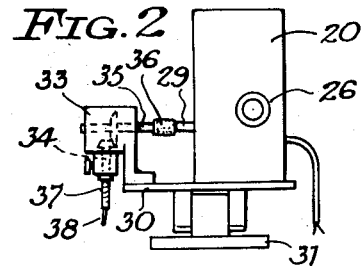
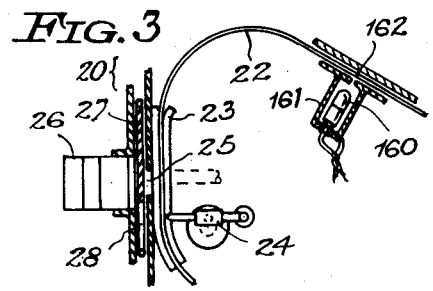
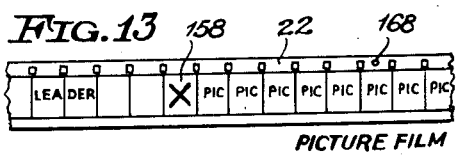
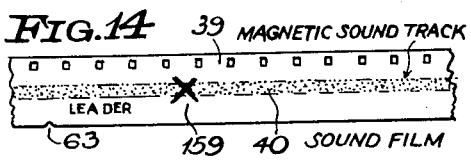
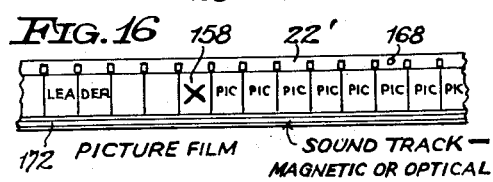
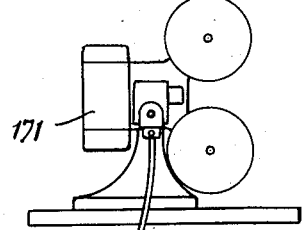
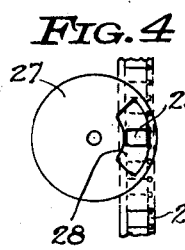
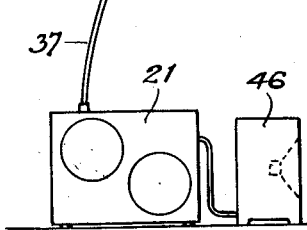
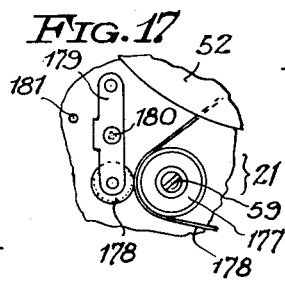
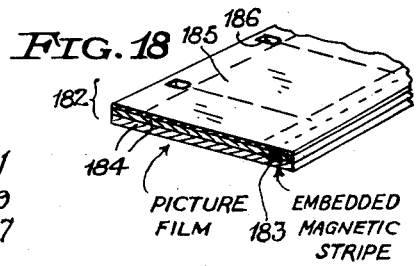
INVENTOR
JOHN H. VAN OSCH
BY Christopher L. Neal
ATTORNEY Sept. 1, 1959  J. H. VAN OSCH  2,901,939
APPARATUS FOR SYNCHRONIZING SOUND WITH MOTION PICTURES
Filed Dec. 9, 1954  4 Sheets-Sheet 2

INVENTOR
JOHN H. VAN OSCH
BY Christopher A. Waal
ATTORNEY

Sept. 1, 1959      J. H. VAN OSCH      2,901,939
APPARATUS FOR SYNCHRONIZING SOUND WITH MOTION PICTURES
Filed Dec. 9, 1954      4 Sheets-Sheet 4
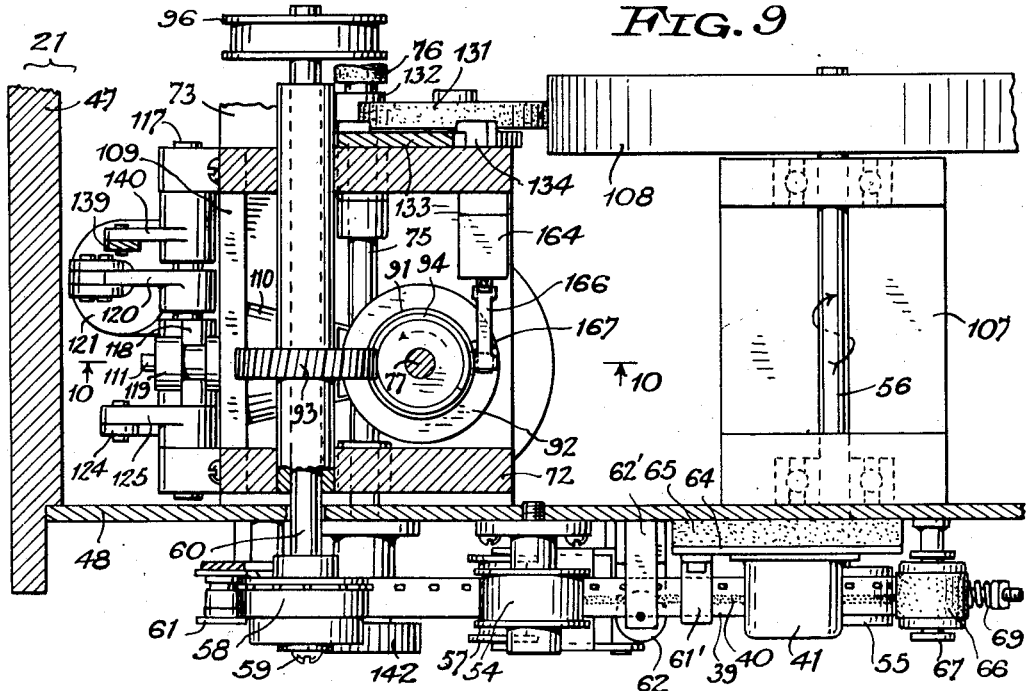
FIG. 9
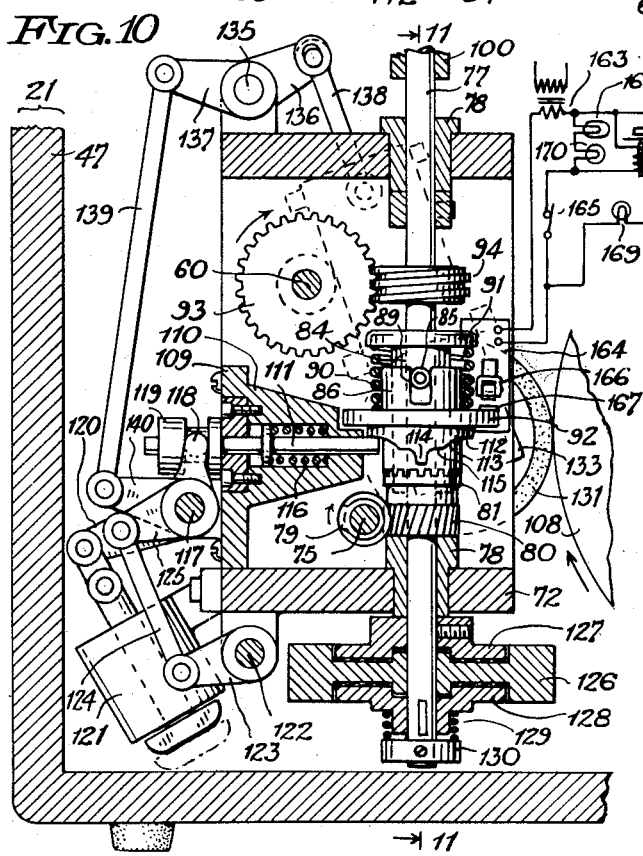
FIG. 10
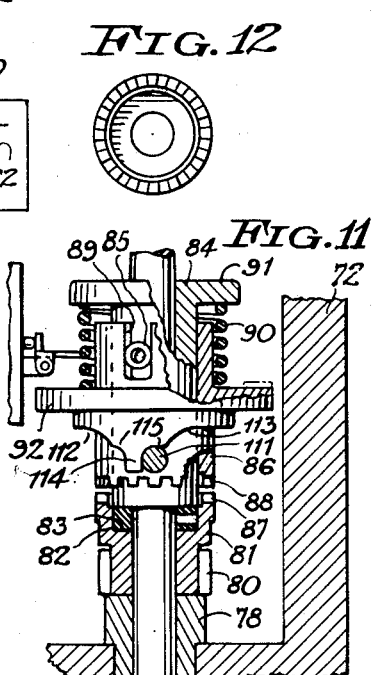
FIG. 12
FIG. 11
INVENTOR
JOHN H. VAN OSCH
BY Christopher L. Waal
ATTORNEY

United States Patent Office 2,901,939
Patented Sept. 1, 1959

2,901,939

APPARATUS FOR SYNCHRONIZING SOUND WITH MOTION PICTURES

John H. Van Osch, Milwaukee, Wis.

Application December 9, 1954, Serial No. 474,203

4 Claims. (Cl. 88—16.2)

The present invention relates to sound motion pictures and to a method and apparatus for the synchronized recording of sound with the taking of a motion picture.

In a system heretofore devised for the production of sound motion pictures in the studio, use is made of a camera and a separate sound recorder which are synchronously driven, the sound recorder being of either the optical or magnetic type. In bringing the driving motors for the camera and recorder up to operating speed, and in stopping the motors, a considerable amount of picture film and sound film is spoiled, and a great deal of editing and splicing is required. In another system, used for newsreel work, the sound is optically recorded on the picture film synchronously with the taking of the picture. This system also requires considerable splicing and editing, since film is wasted at the beginning and end of a take. Moreover, in this single-system there are limitations in the sound quality which can be obtained. In both systems, the apparatus required is quite expensive.

An object of the invention is to provide an improved and simplified sound motion-picture apparatus which is of such character that it will reduce film wastage and minimize splicing and editing, thus making the apparatus suitable for use by amateurs and others.

Another object is to provide a sound motion-picture apparatus which will permit almost instantaneous starting and stopping of synchronized picture film and sound film and avoid the need for splicing between takes or sequences.

A further object is to provide a sound motion-picture apparatus including improved clutch mechanism through which the camera and sound recorder are synchronously driven and which is so arranged that the camera and recorder will always stop at a predetermined point in the cycle of operation at which the camera shutter is closed, thus avoiding overexposed picture frames at the end of each take.

A further object is to provide a sound film drive in which the film when started will almost instantly reach a stable velocity at the recording point, thus making it possible to obtain a number of successive takes or sequences without the necessity for deleting the beginning portion of each take.

A further object is to provide for easy application of reference or synchronizing marks on the picture film and sound film so as to facilitate editing of the film.

A still further object is to provide a sound recording apparatus which can be used with either perforated sound film or non-perforated recording tape.

A still further object is to provide an improved method of applying a synchronized sound track to a picture film after the picture is taken.

A still further object is to provide an improved sound film which will permit application of a magnetic sound stripe thereto before the film is sensitized.

The invention further consists in the several features hereinafter described and claimed.

In the accompanying drawings,

Fig. 1 is an elevational view of one form of sound motion-picture apparatus arranged in accordance with the invention and including a motion-picture camera and a magnetic sound recorder associated therewith;

Fig. 2 is a front view of the camera and its drive;

Fig. 3 is a schematic sectional elevational view of the camera;

Fig. 4 is a schematic view of the camera shutter and film;

Fig. 5 is an elevational view showing the sound recorder associated with a projector;

Fig. 9 is a fragmentary horizontal sectional view of the recorder, taken generally on the line 9—9 of Fig. 7;

Fig. 10 is a fragmentary vertical sectional view of the recorder taken generally on the line 10—10 of Fig. 9, a clutch mechanism thereof being shown in engaged condition;

Fig. 11 is an enlarged fragmentary vertical sectional view of the clutch mechanism, taken generally on the line 11—11 of Fig. 10, the clutch mechanism being released;

Fig. 12 is a detail top view of a driving clutch member;

Fig. 13 is a detail view of a section of marked picture film;

Fig. 14 is a detail view of a section of associated marked sound film;

Fig. 15 is a schematic side elevation of the magnetic play back recorder associated with a film printer for placing a sound track on the film;

Fig. 16 is a view of a section of a marked picture film with a sound track;

Fig. 17 is a fragmentary detail view showing the recorder adjusted for use with unperforated sound tape; and Fig. 18 is a detail sectional perspective view of a modified form of picture film with a magnetic sound stripe.

Figure 6:
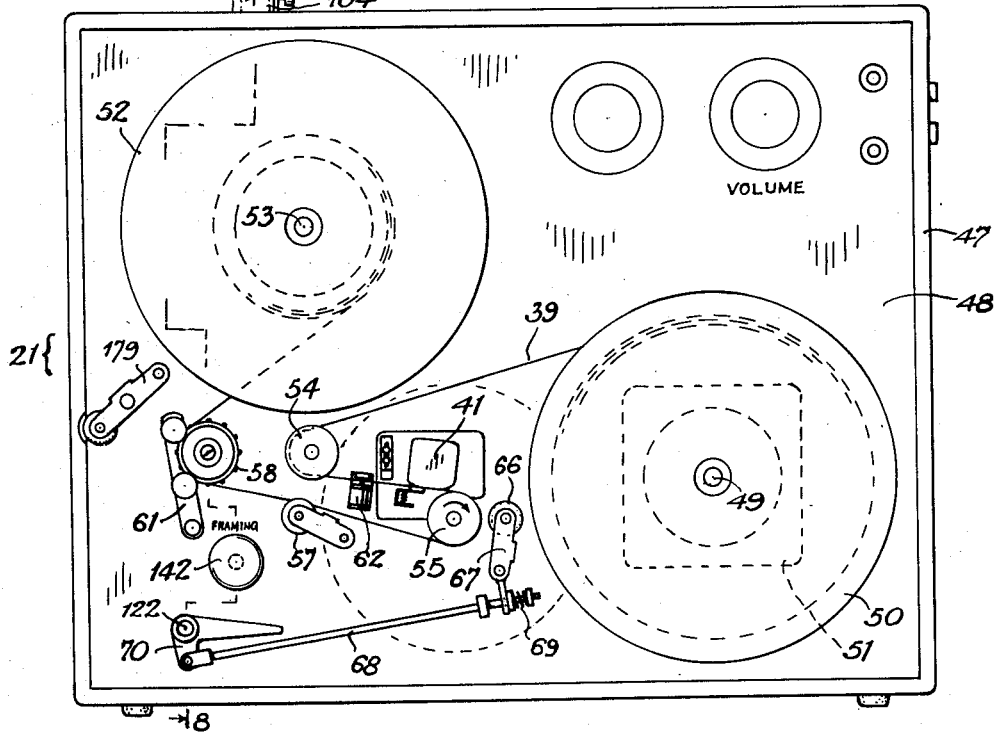
Fig. 6 is a front view of the sound recorder in stopped condition.

In the drawings, 20 designates a motion-picture camera of any conventional type, and 21 designates a magnetic sound recorder hereinafter more fully described. By way of example, the camera is of the type using 16 mm. single-perforated picture film 22, Fig. 13, operating at 24 frames per second. The picture film is preferably of the reversal type, although in some instances negative film may be used, as when prints are desired. It is also possible to use 8 mm. film, as hereinafter described. The camera is provided with a film gate 23, Fig. 3, along which the film is intermittently advanced by a pull-down device 24 to register with an exposure aperture 25. A detachable lens 26 is aligned with the exposure aperture, and a shutter 27, here shown to be of the rotary type, is placed at the front of the aperture 25 and has an opening 28 to expose the film. The camera is equipped with a drive shaft 29, Fig. 2, which is driven synchronously with the sound recorder, as hereinafter described.

The camera is here shown to be mounted on the tiltable platform 30 of a tripod 31, the platform being provided wih the usual handle 32. The recorder 21 is set on the floor near the tripod. An angle gear head 33 is secured to the platform at one side of the camera and has a downwardly projecting input shaft 34, Fig. 2, and a horizontally extending output shaft 35, the latter shaft being aligned with the camera drive shaft 29 and connected thereto by a rubber coupling 36. A flexible cable 37 has its opposite ends detachably connected to the gear head and sound recorder and includes a flexible drive shaft 38 which is driven under the control of clutch mechanism hereinafter described.

Figure 7:
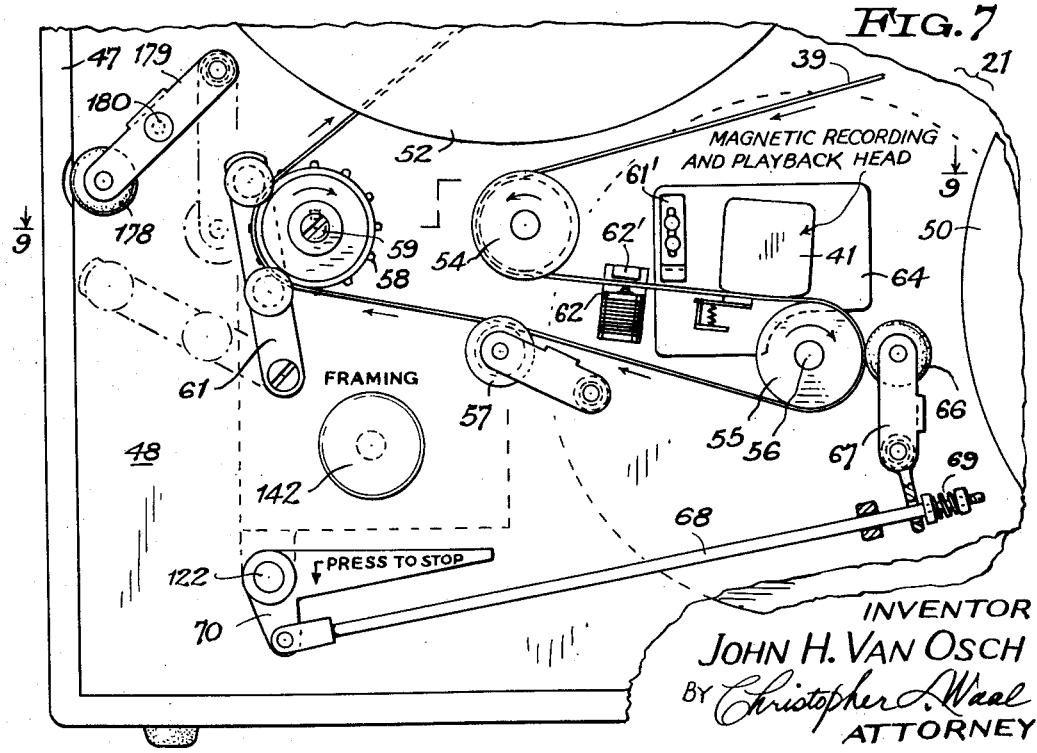
Fig. 7 is an enlarged fragmentary front view of the recorder in running condition.
Figure 8:
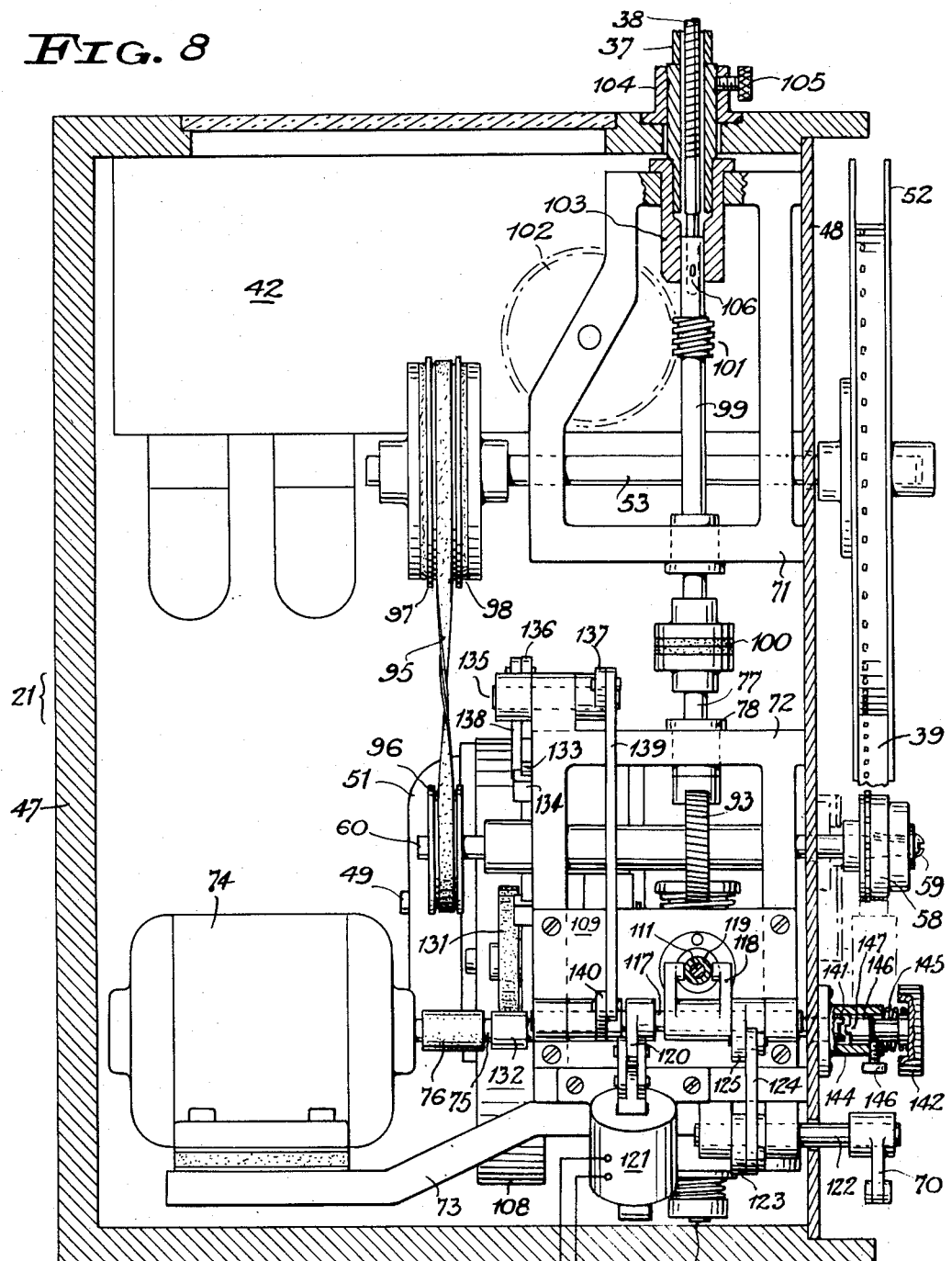
Fig. 8 is a transverse vertical sectional view of the recorder, taken generally on the line 8—8 of Fig. 6, the view also showing control circuits.

The sound recorder 21 utilizes single-perforated magnetic sound film or strip 39, Fig. 14, provided with a magnetic sound track 40 of either the single or multiple lane type. The sound film is preferably of the 16 mm. size and is driven at the same speed as the picture film. The recorder includes a magnetic recording and playback head 41, Figs. 7 and 9, which is associated with an amplifier 42, Fig. 8, provided with the usual controls, and including the usual output stage 43 and the oscillator stage 44 connected in circuit with the head. A microphone 45 is suitably connected to the amplifier, and a loud speaker 46 is also connected to the amplifier for playback and for use during projection.

The sound recorder 21 is here shown to include a cabinet 47 with a vertical front panel 48, the amplifier 42 being mounted in the cabinet, and the panel carrying a film drive assembly, hereinafter described, for the perforated sound film 39. Projecting from the panel near the lower right-hand side thereof, Fig. 6, is a horizontal shaft 49 adapted to detachably receive a feed reel 50 for the sound film, the shaft having the usual slipping brake, not shown, operable during feeding of the film. Suitable provision is made for rewinding the film, such as a rewind motor 51 carrying the shaft 49. After traversing the film drive assembly the film is wound onto a take-up reel 52 detachably carried on a horizontal shaft 53 projecting from the upper right-hand portion of the front panel. The sound film 39 extends leftward from the feed reel, Figs. 6 and 7, and passes reversely over a flanged idler pulley 54 mounted on the front panel, and thence passes reversely over a sound drum 55 mounted on a horizontal shaft 56 projecting from the front panel. The film thence passes leftward over a spring-tensioned stabilizer pulley 57 and about a sprocket 58 detachably secured, as by a screw 59, on the tapered front end of a horizontal shaft 60 projecting from the front panel. The sprocket shaft is driven as hereinafter described, and the film is held on the sprocket by a swingably mounted sprocket lock 61. From the sprocket 58 the sound film passes to the take-up reel 52. In its travel from the idler pulley 54 to the sound drum 55, the film passes over an electromagnetic punch or marking device 62 carried on the panel and cooperating with an anvil 62' for producing a notch, indentation or other mark 63, Fig. 14, at the edge of the film and at a point located a predetermined number of frames from the recording head. The marking device is operated as hereinafter described. Near the sound drum the film passes under the magnetic recording and playback head 41 which is carried on a mounting plate 64 resiliently secured to the panel by a rubber cushion sheet 65, Fig. 9. During the travel of the film over the sound drum, the film is pressed against this drum by a pressure roller 66 carried on a spring-pressed lever 67 which is pivotally mounted on the panel. The lever 67 is swung away from holding position when the sound film is at rest, as by a link 68 connected at one end to the lever by a lost motion spring connection 69 and at the other end to a bell-crank lever 70 which is manually or automatically actuated, as hereinafter described.

Near the left-hand end of the panel 48 an upper frame 71 and a lower frame 72 are secured to the inner face of the panel. The lower frame carries a rearwardly projecting bracket 73 on which a constant speed electric motor 74, such as a synchronous motor, is resiliently mounted. A horizontal input or power shaft 75 is journalled in the lower frame 72 at right angles to the panel and is drivingly connected at its rear end to the motor shaft by a rubber coupling 76. A vertical drive shaft 77 is rotatably mounted in the lower frame and is driven from the input shaft 75 through gearing and clutch mechanism hereinafter described. The shaft 77 rotates at one revolution per picture film frame, and in the present instance also at one revolution per sound film frame. The drive shaft 77 is journalled in bushings 78 secured in the lower frame and is confined against axial movement. A helical gear 79 on the horizontal input shaft 75 meshes with a helical gear 80 formed on a toothed or jaw clutch member 81 rotatably carried on the drive shaft 77 and free to turn thereon. The clutch member 81 is axially confined between the lower bushing 78 and a collar 82, Fig. 11, which is pinned to the drive shaft and is disposed in a recess 83 formed in the upper end of the clutch member. By way of example, the motor 74 rotates at 1800 r.p.m. and the vertical drive shaft 77 rotates at 1440 r.p.m., corresponding to a picture film speed of 24 frames per second.

A cylindrical thimble or tubular member 84 is fixed on the drive shaft 77 above the driving clutch member 81, as by a set screw or locking pin 85. Axially slidable on the tubular member 84 against relative rotation is a toothed driven clutch member or sleeve 86 which cooperates with the subjacent clutch member 81, the two clutch members having respective sets of complementary hardened clutch teeth or jaws 87 and 88 of generally rectangular shape. If desired, the teeth may have slightly tapered side walls. Relative rotation of the driven clutch member 86 with respect to the drive shaft 77 is suitably prevented, as by disposing the head of the set screw or pin 85 in a longitudinal slot 89 formed in this clutch member. The axially shiftable clutch member or sleeve 86 is urged downwardly to clutching position by a coiled spring 90 surrounding the sleeve, the upper end of the spring bearing against an annular top flange 91 formed on the sleeve, and the lower end of the spring bearing on an annular flange 92 formed on the slidable clutch member. The clutch is controlled as hereinafter described.

The horizontal sprocket shaft 60 is journalled in the lower frame 72 and carries a helical gear 93 meshing with a helical gear 94 secured to the vertical drive shaft 77 above the clutch, thus driving the sprocket 58 when the clutch is engaged. By way of example, the sprocket is shown to have 12 teeth and rotates at one-twelfth the speed of the vertical shaft.

The take-up reel shaft 53 is journalled in the upper frame 71 and is suitably driven as by a crossed belt 95 which engages a pulley 96 on the rear end of the sprocket shaft 60 and passes over a pulley 97 which is coaxial with the sprocket shaft and clutched thereto by a slipping friction clutch 98.

The upper frame 71 has also journalled therein a vertical extension shaft 99, Fig. 8, aligned with the vertical drive shaft 77 of the clutch mechanism, the two shafts being connected by a flexible coupling 100 which minimizes noise transmission to the upper shaft. The shaft 99 carries a pinion 101 meshing with a gear 102 forming a part of a footage counter and timer switch mechanism, not shown.

A vertical bushing 103 is secured in the upper portion of the upper frame and has journalled therein the upper end of the vertical shaft 99. The bushing also forms a socket detachably receiving therein the lower end of the casing of the flexible cable 37, the cable end being secured in a fixed sleeve 104, as by a thumb screw 105. The upper end of the extension shaft 99 is tubular to receive the lower end of the flexible shaft 38 and has an oriented splined connection 106 with the flexible shaft.

The sound drum shaft 56 is journalled in a bracket 107 secured to the rear face of the front panel 48, and carries a fly-wheel 108 at its rear end. During the travel of the sound film 39 the sound drum is driven by the film and exerts a stabilizing influence on the rate of film travel past the recording head. As hereinafter described, the fly-wheel is also rotated when the sound film is at rest. The fly-wheel and connected sound drum form a stabilizer or filter.

A cross plate 109, Fig. 10, is secured to the lower frame 72 and is provided with an inwardly projecting hollow hub portion 110 in which is slidable a horizontal clutch control pin or plunger 111, the pin extending radially of the vertical drive shaft 77. The pin 111 has an inner end which cooperates with an axially or downwardly facing arcuate cam track 112 formed concentrically on the shiftable clutch member 86. The cam track includes ramp surfaces 113, a stop shoulder 114, and detent or dwell surfaces 115 adjacent to the stop shoulder. As hereinafter more fully described, the pin 111 when projected inwardly serves to release the clutch within less than the movement of one frame of film and at a predetermined point in the operation of the camera at which the camera shutter is closed, so as not to fog or overexpose the last few frames of pictures film.

The clutch control pin or plunger 111 is urged outwardly from the cam track 112 of the clutch member 86 by a coiled spring 116, permitting the shiftable clutch member 86 to be spring-urged downwardly into positive clutching engagement with the continuously rotating driving clutch member 81 so as to effect simultaneous and almost instantaneous starting of the camera and the sound recorder. The cross plate 109 carries a horizontal rock-shaft 117 having a shifting fork 118 engaging an annularly grooved collar 119 secured to the clutch control pin. A lever 120 is fast on the rock-shaft 117 and is linked to a solenoid 121 mounted on the frame 72 and controlled as hereinafter described. When the solenoid 121 is deenergized the clutch control pin 111 is spring-urged outwardly away from the cam track of the movable clutch member, permitting spring-urged engagement of the clutch. Since the solenoid is not energized during recorder operation, hum pick-up by the recorder circuits is avoided. When the solenoid is energized, the rock-shaft 117 is angularly displaced, moving the clutch control pin 111 inwardly and causing the cam track ramp 113 of the clutch sleeve 86 to ride up on the pin and release the clutch. The clutch sleeve comes to a stop with the pin against the stop shoulder 14 of the shiftable clutch sleeve, thus stopping the vertical shaft in a predetermined position to insure a closed camera shutter, since the shutter is driven from the clutch-controlled drive shaft 77 through the oriented flexible cable 37. Each dwell or detent 115 of the cam track serves to prevent reverse rotation of the clutch sleeve after it comes to a stop. The ramps 113 and dwells 115 are duplicated at each side of the stop 114, thus permitting operation of the camera in reverse direction, as for making lap dissolves and other camera effects.

The bell-crank lever 70 for actuating the pressure roller 66 is carried on the front end of a horizontal rock-shaft 122 which is journalled in the frame 72. The shaft 122 carries a lever arm 123 which is connected by a link 124 to a lever arm 125 fast on the rock-shaft 117. Thus, whenever the solenoid 121 is energized to release the clutch, the pressure roller 66 will be released from the sound film passing over the sound drum. The bell-crank lever 70 may also be manually actuated to stop the operation of the recorder and camera.

At its lower end the vertical drive shaft 77 carries a fly-wheel 126 which is relatively rotatable with respect thereto and is driven under a light friction by upper and lower clutch disks 127 and 128. The upper disk is fixed on the vertical shaft, and the lower disk is splined on the shaft and is urged upwardly by a coiled spring 129 surrounding the shaft, the spring bearing on a shaft collar 130. During starting and stopping of the vertical drive shaft 77, the fly-wheel is free to turn on the shaft so as not to interfere with starting and stopping operations. When the clutch is released by inward movement of the control pin 111, the fly-wheel will insure abutment of the clutch member stop shoulder 114 with the pin so as to stop the shaft 77 at the proper point in its travel, insuring full closure of the camera shutter. The dwell 115 of the cam track will prevent retrograde movement of the upper clutch member after the latter is stopped.

A rubber-faced idler wheel 131 is provided to transmit power from the periphery of a collar 132 on the input shaft 75 to the periphery of the sound-drum fly-wheel 108. The idler wheel 131 is carried on a shiftable supporting member 133, here shown to be a slide plate carried by gibs 134 on the rear face of the lower frame 72. A rock-shaft 135 is carried on the upper part of the frame 72 and is provided with arms 136 and 137 the former of which is connected by a lost-motion link 138 to the slide plate, and the latter of which is connected by a link 139 to a lever arm 140 secured to the rock-shaft 117. By this arrangement, the idler wheel 131 is lifted free of the shaft collar 132 and fly-wheel 108 when the camera and sound recorder are operating, and is lowered into power-transmitting relation to the shaft collar and fly-wheel when the recorder is stopped so as to maintain the fly-wheel in rotation at its proper speed before each start of the recorder. This insures the sound film reaching a constant velocity at the sound drum suitable for sound recording, substantially at the moment the film drive mechanism is started, so as to avoid the necessity for deleting several feet of picture film and sound film at the beginning of each take.

The motor-driven input shaft 75 is slotted at its front end to form a jaw clutch 141, and when the motor is deenergized this shaft is adapted to cooperate with a manually operable rotatable framing adjuster 142, Fig. 8. The adjuster includes an axially shiftable stub shaft 143 coaxial with the input shaft and slidably supported in a flanged bushing 144 secured to the front panel, the stub shaft being normally urged outwardly by a coiled spring 145 to a limit position determined by a stop screw 146. The stub shaft has a clutch-forming inner end 147 engageable with the input shaft when the adjuster is pushed inwardly, thus permitting shifting of the sound film and picture film in either direction.

The front end of the input shaft 75 is tubular and splined, like the upper end of the vertical extension shaft 99, so that after removing the framing adjuster, the flexible cable 37, or a similar cable, may be inserted in the bushing 144 and drivingly connected to the shaft 75 for connecting the recorder to other devices, such as an optical recorder 148, Fig. 15. The use of this optical recorder in cooperation with the magnetic recorder is hereinafter described.

As seen in Fig. 8, the clutch control solenoid 121 is connected in a circuit 149 to a source of current 150 through a push-button switch 151 which when pressed energizes the solenoid to stop the operation of the recorder and camera. The push-button switch 151 is preferably of the type which can be latched in closed position, and is here shown to have two sets of successively actuated contacts 152 and 153, the former being included in the solenoid circuit. The contacts 153 are connected in a circuit 154 including the winding of a relay 155 having two sets of contacts 156 and 157. When the push-button switch is open or released, the relay 155 is deenergized and its contacts are open. The relay contacts 156 when closed serve to disable the recording head, as by removing the plate voltage from the output stage 43. The relay contacts 157 when closed serve to disable the bias oscillator stage, as by grounding the screen grid of the bias oscillator tube. When the push-button switch 151 is pressed to stop the recorder and camera, the switch contacts 153 close before the contacts 152, thus first energizing the relay 155 to disable the recording head and bias oscillator, and then energizing the solenoid to stop the recorder and camera. When the push-button is released to restart the recorder and camera, the solenoid is first deenergized to effect clutch engagement, and the relay 155 is then deenergized to reactivate the recording head and bias oscillator. This circuit arrangement avoids recording of unwanted sound incident to the operation of the solenoid. The push-button switch is here shown to be hand-manipulated, but it can be in the form of a foot-operated switch. In some instances, the clutch can be controlled by manual operation of the bell-crank lever 70.

When setting up the camera and recorder for use, the picture film and sound film are suitably marked so as to facilitate editing and subsequent projection of the picture film in synchronism with the sound film, and also for optical recording, as hereinafter described. This marking can be done by applying a pencil mark 158, Fig. 13, to the frame of the picture film at the camera aperture, after removing the lens, and applying a similar pencil mark 159, Fig. 14, to the frame of the sound film at the recording head. The marks 158 and 159 are in exact synchronization. Instead of applying a mark to the picture film it is usually sufficient to expose the frame of picture film at the camera aperture by removing the lens, or by capping the lens for one single picture frame.

In another method of marking the films, a small area of one frame of the picture film, at one side thereof and between the sprocket holes, and at a predetermined number of frames from the camera aperture, is exposed by a small electric lamp 160, Fig. 3, mounted in the camera and housed in a closed chamber 161 having a small hole 162 in an end wall and near the film. The sound film is marked at 63, Fig. 14, at a predetermined number of frames from the recording head gap by the marking device 62, hereinbefore described. The lamp and marking device are connected in parallel in a supply circuit 163, Fig. 10, having a control switch 164, hereinafter described, and a manually operable, series connected, disabling switch 165. The control switch 164, such as a Micro switch, is carried by the lower frame 72 and has a roller arm 166 engageable with a cam projection 167 formed on the upper side of the annular flange 92 of the shiftable clutch member 86. When the clutch is engaged the Micro switch 164 is open, and when the clutch is released, the Micro switch is momentarily closed by the associated cam projection 167 shortly before the driven clutch member 86 reaches stopped position, so as to energize the marking electromagnet 62, the Micro switch being open in the stopped position of the clutch. Simultaneously the marking lamp 160 is momentarily lighted to produce an exposed area 168 on the perforated edge of the picture film between sprocket holes. An indicator lamp 169 is connected in parallel with the marking devices, and an indicator lamp 170 is placed in series with the marking lamp.

When the apparatus is to be used for taking a motion picture with synchronized sound, the picture film 22 is threaded in the camera, and the sound film 39 is threaded in the recorder. The synchronization marks, such as 158 and 159, or 63 and 168, are placed on the picture film and sound film. A few feet of leaders on both films are run off by starting the motor 74 with the clutch 81, 86, engaged, and the clutch is then disengaged by depressing the push-button switch 151, thus stopping both the camera and recorder. The camera shutter 27 is then in closed position, and the camera is ready to operate. To make a take the push-button switch 151 is released, causing engagement of the jaw clutch 81, 86, to effect almost instantaneous starting of both the camera and the recorder in synchronized relation. At the end of a take, the push-button switch is depressed, thus disengaging the clutch and effecting an almost instantaneous stopping of the camera and recorder at the desired point, the stop shoulder 114 of the driven clutch member 86 abutting against the clutch control pin 111. Successive takes are made in the same manner, producing a series of scenes or sequences with no intervening overexposed frames of picture film. The sound is magnetically recorded on the sound film in synchronism with the picture and is substantially free of "wow" at the beginning and end portions of the associated sound takes.

In reproducing the picture and sound, several methods may be employed. In one of these methods, the picture film is developed and placed in a projector 171, Fig. 5, and the sound film is played back on the recorder 21 through the loud speaker 46 in exact synchronism with the picture, synchronous operation being obtained by the use of the flexible cable 37 interconnecting the recorder and projector. This double-system is particularly suitable when 8 mm. picture film is used, because the sound film, such as 16 mm. film, when running at the same frame speed as the picture film, has a linear velocity double that of the picture. This provides a much higher quality of sound than could be obtained if the sound track were carried on the picture film. If extremely high sound quality is desired, it is possible to run the sound film at a higher frame speed than the picture film frame speed when the picture is taken and to use the same speed ratio during projection.

In another method, the developed picture film has applied thereto a magnetic stripe and is placed in a magnetic recording projector and interlocked with the magnetic recorder to re-record the sound from the original magnetic sound track to the magnetic stripe on the picture film. During subsequent projection the sound is reproduced from the magnetic stripe on the picture film.

In a further method, constituting a feature of the present invention, an optical sound track 172 is recorded on the exposed but undeveloped picture film and the resulting picture film 22', Fig. 16, is then developed and can be projected in an optical sound projector. In this method the exposed but undeveloped picture film 22 of Fig. 13 is rewound and placed in the optical sound recorder 148 shown schematically in Fig. 15. The optical recorder is of any conventional type including a sound drum 173 and a modulated light source 174 for producing either a variable-area or a variable-density sound track. The optical recorder is also provided with an exposed shaft extension 175 of a drive motor of the synchronous type running at 1800 r.p.m. The flexible cable 37 is connected at one end to the shaft extension 175 and at the other end to the front end of the power input shaft 75 of the magnetic recorder. The cable provides an interlocking drive between the magnetic recorder and the optical recorder to insure proper placement of the optical sound track on the picture film. The frame of the picture film which was prevously marked at the camera aperture is placed at the optical recorder sound drum at the point of impingement of the modulated light beam. The sound film 39 is also rewound, and the synchronization mark frame 159 thereof is placed in the magnetic recorder at a point 25 frames in advance of its original position to provide the usual 25 frame lead of the optical sound track on the picture film. The magnetic recorder amplifier is placed in playback condition and is electrically connected to the modulated light source 174 of the optical recorder. Preferably, both the magnetic recorder motor and the optical recorder motor are energized simultaneously. However, one of these motors, preferably the optical recorder motor, can be used for driving both machines, the other motor being mechanically disconnected. This novel method produces a picture film with an optical sound track of high quality when only an original is required. In this method the optical sound track is recorded directly from the original master magnetic sound track.

When a copy of the original film is required, a picture print only is made from the original picture film but is not developed. In this operation, the synchronization frame 158 of the original picture film is placed in contact with raw film stock, and the raw film is marked at this point to provide the same synchronization point on the copy. After the picture only has been printed but not developed, the copy is placed in the optical recorder 148 in predetermined position, and an optical sound track is exposed on the copy in the same manner as on the original film. The copy is then developed to produce a finished print. This novel method of making a print provides an optical sound track of highest quality and eliminates the necessity for making a separate optical track from the original magnetic sound track, which has heretofore been required for making release prints.

The recorder 21 can also be used as a tape recorder employing standard ¼ inch magnetic tape 176 by substituting a plain drum 177, Fig. 17, for the sprocket 58, and swinging down against the tape a pressure roller 178 carried on a spring-pressed swingable arm 179 mounted on the panel 48. When not in use the arm 179 is held in retracted position by a locking pin 180 engageable in an opening 181 in the panel. A shiftable forked guide 61' for the tape is mounted on the plate 64 near the recording head. The tape is driven by frictional contact with the periphery of the drum 177.

In Fig. 18 there is shown an improved and inexpensive form of picture film stock 182 with a magnetic stripe 183 which is applied before the film is sensitized. The film comprises a pair of laminations 184 of film base stock sealed together and enclosing between them the magnetic stripe 183, here shown to be placed near one edge of the film. The film carries a sensitized emulsion layer 185, and is provided with a row of sprocket holes 186. An advantage of the embedded magnetic stripe is that it can be applied before the film is exposed and developed and is not affected by film processing. Another advantage is economy of manufacture since a plurality of the magnetic stripes can be placed in spaced parallel relation on wide rolls of film stock which are then laminated to enclose the stripes and are slit and perforated to form the film.

The motor-driven clutch mechanism and its controlling means are here shown to be incorporated in a magnetic recorder unit adapted for interlocked drive with a camera, but the apparatus can also be embodied directly in a camera, such as of the single-system type, to provide for shutter control and also sound stabilization at starting and stopping. The apparatus may further be embodied in a sound motion picture projector, particularly of the magnetic recording type.

I claim:

1. In a sound motion picture apparatus, a motion picture camera having an operating mechanism including a film drive and a shutter, sound recording means including a film-driving sprocket and a film-driven sound drum, driving means for synchronously operating the camera and recording means including a rotatable drive member and a positively acting jaw clutch for transmitting motion to said drive member, said clutch including a driving clutch member and a driven clutch member, said latter member being mounted on and drivingly connected to said rotatable drive member and being shiftable to an engaged position to start the camera and recorder and to a released position to stop the camera and recorder, control means operable upon release of said clutch for stopping said driven clutch member within one revolution of said member and at a predetermined point of rotation in which the camera shutter is in closed position, and driving means for continuing the rotation of said sound drum at a substantially normal constant speed while said film-driving sprocket and the film thereon are at rest.

2. In a sound motion picture apparatus, a motion picture camera having an operating mechanism including a film drive and a shutter, sound recording means including a film-driving sprocket and a film-driven sound drum, driving means for synchronously operating the camera and recording means including a rotatable drive member and a positively acting clutch for transmitting motion to said drive member, said drum member being drivingly connected to said camera and sound recording means, stop control means operable upon release of said clutch for stopping said drive member within one revolution of said member and at a predetermined point of rotation in which the camera shutter is closed, film marking means operable by the release of said clutch mechanism, and driving means for continuing the rotation of said sound drum at a substantially normal constant speed while said film-driving sprocket and the film thereon are at rest.

3. In a sound motion picture apparatus, a motion picture camera having a film drive mechanism and a shutter, a magnetic recorder having a synchronous driving connection with said drive mechanism and including a film-driving sprocket and a film-driven sound drum, driving means for said camera mechanism and recorder including a jaw clutch with driving and driven clutch members, said driven clutch member being drivingly connected to said camera and recorder and being shiftable to an engaged position to start the camera and recorder and to a released position to stop the camera and recorder, control means operable upon release of said clutch for stopping said driven clutch member within one revolution of said driven clutch member and in a predetermined angular position in which the camera shutter is closed, and driving means for continuing the rotation of said sound drum at a substantially normal constant speed while said film-driving sprocket and the film thereon are at rest.

4. In a sound motion picture apparatus, a motion picture camera having an operating mechanism including a film drive and a shutter, a sound recorder including a film-driving sprocket and a film-driven sound drum, an electric motor, a driving connection between said motor and said camera and recorder including a positive jaw clutch having a rotatable driving clutch member and a rotatable driven clutch member, said latter member being drivingly connected to said camera and recorder and being shiftable to engaged position to start the camera and recorder and to a released position to stop the camera and recorder, control means operable upon release of said clutch for stopping said driven clutch member within one revolution of said driven clutch member and in a predetermined angular position of the latter member in which the camera shutter is closed, and driving means connecting said motor and sound drum for continuing the rotation of said sound drum at a substantially normal constant speed while said film-driving sprocket and the film thereon are at rest.

References Cited in the file of this patent

UNITED STATES PATENTS

| 1,255,822 | Rogers | Feb. 5, 1918 |
| 1,428,845 | Gray | Sept. 12, 1922 |
| 1,812,449 | Rogers | June 30, 1931 |
| 1,866,712 | Jones | July 12, 1932 |
| 2,026,232 | Joachim | Dec. 31, 1935 |
| 2,052,792 | Owens | Sept. 1, 1936 |
| 2,106,338 | Black | Jan. 25, 1938 |
| 2,196,358 | Heinisch | Apr. 9, 1940 |
| 2,413,443 | Frankel | Dec. 31, 1946 |
| 2,479,869 | Rossmann et al. | Aug. 23, 1949 |
| 2,667,808 | Hart | Feb. 2, 1954 |

FOREIGN PATENTS

| 561,460 | Germany | Oct. 14, 1932 |